United States Patent
Brault

(10) Patent No.: US 6,721,607 B2
(45) Date of Patent: Apr. 13, 2004

(54) PROGRAMMABLE LOGIC CONTROLLER PROVIDED WITH COMMUNICATION FUNCTIONS IN A CLIENT-SERVER ARCHITECTURE

(75) Inventor: Gilbert Brault, Vence (FR)

(73) Assignee: Schneider Electric Industries SA, Rueil-Malmaison (FR)

( * ) Notice: Subject to any disclaimer, the term of this patent is extended or adjusted under 35 U.S.C. 154(b) by 354 days.

(21) Appl. No.: 09/768,619

(22) Filed: Jan. 25, 2001

(65) Prior Publication Data
US 2001/0014833 A1 Aug. 16, 2001

(30) Foreign Application Priority Data
Jan. 26, 2000 (FR) .................................. 00 01015

(51) Int. Cl.⁷ ............................................. G05B 11/01
(52) U.S. Cl. ........................... 700/18; 700/19; 700/83; 709/223
(58) Field of Search ...................... 700/83, 67, 18–19, 700/9, 20, 23, 65–66, 86; 709/106–107, 220, 221, 223–225

(56) References Cited

U.S. PATENT DOCUMENTS

| | | | |
|---|---|---|---|
| 5,225,975 A | | 7/1993 | Gates et al. .................. 700/18 |
| 5,453,933 A | * | 9/1995 | Wright et al. ............... 700/181 |
| 5,771,174 A | | 6/1998 | Spinner et al. ............. 700/129 |
| 5,805,442 A | * | 9/1998 | Crater et al. ................... 700/9 |
| 5,985,214 A | | 11/1999 | Stylli et al. .................... 422/65 |
| 6,061,603 A | * | 5/2000 | Papadopoulos et al. ....... 700/83 |
| 6,151,625 A | * | 11/2000 | Swales et al. ............... 709/218 |
| 6,192,281 B1 | * | 2/2001 | Brown et al. .................. 700/2 |
| 6,282,454 B1 | * | 8/2001 | Papadopoulos et al. ....... 700/83 |
| 6,330,525 B1 | * | 12/2001 | Hays et al. .................. 702/183 |
| 6,526,566 B1 | * | 2/2003 | Austin ......................... 717/109 |
| 6,564,242 B1 | * | 5/2003 | Bonet et al. ................. 709/201 |
| 6,567,863 B1 | * | 5/2003 | Lafuite et al. ................. 710/8 |
| 6,640,140 B1 | * | 10/2003 | Lindner et al. .............. 700/18 |

FOREIGN PATENT DOCUMENTS

| | | |
|---|---|---|
| EP | 0 916 466 A1 | 5/1999 |
| JP | 11-024716 | 1/1999 |
| WO | WO 99/13388 | 3/1999 |

\* cited by examiner

Primary Examiner—William Grant
Assistant Examiner—Ronald D Hartmen, Jr.
(74) Attorney, Agent, or Firm—Oblon, Spivak, McClelland, Maier & Neustadt, P.C.

(57) ABSTRACT

A programmable logic controller system including a private operating system that does not support a TCP/IP protocol, and a communication module connected to a private communication bus and a TCP/IP network, and at least one intelligent module. The communication module includes TCP/IP connection and communication functions, a plurality of delegation services, and a transcoding and routing service configured to encode, decode, and route a request. The private communication bus includes a plurality of supported protocols. Further, the at least one intelligent module includes an HTTP server and at least one application having an application programming interface. The application programming interface is configured to use the TCP/IP connection and communication functions from a remote location. In addition, the plurality of delegation services are configured to enable the at least one application in the at least one intelligent module to delegate services to the communication module on the TCP/IP network.

9 Claims, 3 Drawing Sheets

PROGRAMMABLE LOGIC CONTROLLER PROVIDED WITH COMMUNICATION FUNCTIONS IN A CLIENT-SERVER ARCHITECTURE

BACKGROUND OF THE INVENTION

1. Field of the Invention

This invention relates to a programmable logic controller provided with a private operating system that does not support the TCP/IP protocol but is adapted to automation programs and is equipped firstly with at least one intelligent module in which an HTTP server is installed, and secondly a communication module that can be connected to remote equipment through a bus.

2. Description of the Background

A modular programmable logic controller is composed of a programmable processing unit and intelligent modules that perform automation functions (for example weighing, axis control, regulation, etc.) and are connected to the processing unit through a communication bus or networks with private protocols. The hardware and software technology (real time kernel, operating system and communication protocol) of the logic controller is usually "proprietary", in other words specific to the logic controller manufacturer. The programmable processing unit contains the application written in a logic controller programming language (for example in the language known as PL7 for Schneider Automation logic controllers). An intelligent module is a microcomputer provided with a processing unit, RAM and ROM and private inputs/outputs.

Furthermore, the logic controller may be equipped with a communication module for connection to a TCP/IP type network and On/Off or analog input/output modules.

A TCP/IP communication module implements server functions (for example the HTTP server function) that enables a TCP/IP client to connect itself to the logic controller through a network under the TCP/IP protocol. Remember that a TCP/IP client is equipment that opens a connection to a TCP/IP server under its own initiative. The TCP/IP communication module may also implement a client function on TCP/IP so that it can be connected to the server TCP/IP equipment.

The TCP/IP communication module can be used as a bridge to transport frames from a network with a private protocol to a network with a TCP/IP type protocol. If the communication module is to offer services like an FTP (File Transfer Protocol) downloading server, or HTTP (Hypertext Transfer Protocol) or SNMP (Simple Network Management Protocol) agent, the system unit of the programmable logic controller makes data areas available that these various services present to remote client stations in the TCP/IP network. Client services such as "mail", FTP type client, SNTP (Simple Network Time Protocol) type client, or SAP type client (client software/company management server particularly including production management functions) can enable the logic controller application program to store information output from remote servers using these protocols, in memory. Client or server functions are predefined and coded in the TCP/IP communication module. An adaptation application must be implemented in the logic controller system unit before services provided by intelligent modules are accessible from the network.

SUMMARY OF THE INVENTION

The purpose of the invention is to enable an intelligent module to host a client function or a server function or to be a member of a Multicast group by using TCP/IP services provided by a communication module defining the configuration of the programmable logic controller. In this case the intelligent module can be used by a member of the TCP/IP network as if it were physically connected to it.

The logic controller according to the invention is characterized by the fact that the intelligent module is provided with an application programming interface that enables remote use of connection and communication functions of a TCP/IP type communication module.

BRIEF DESCRIPTION OF THE DRAWINGS

The invention will now be described in more detail with reference to an embodiment given as an example and shown in the attached drawings on which.

DESCRIPTION OF THE PREFERRED EMBODIMENT

Figure 1:
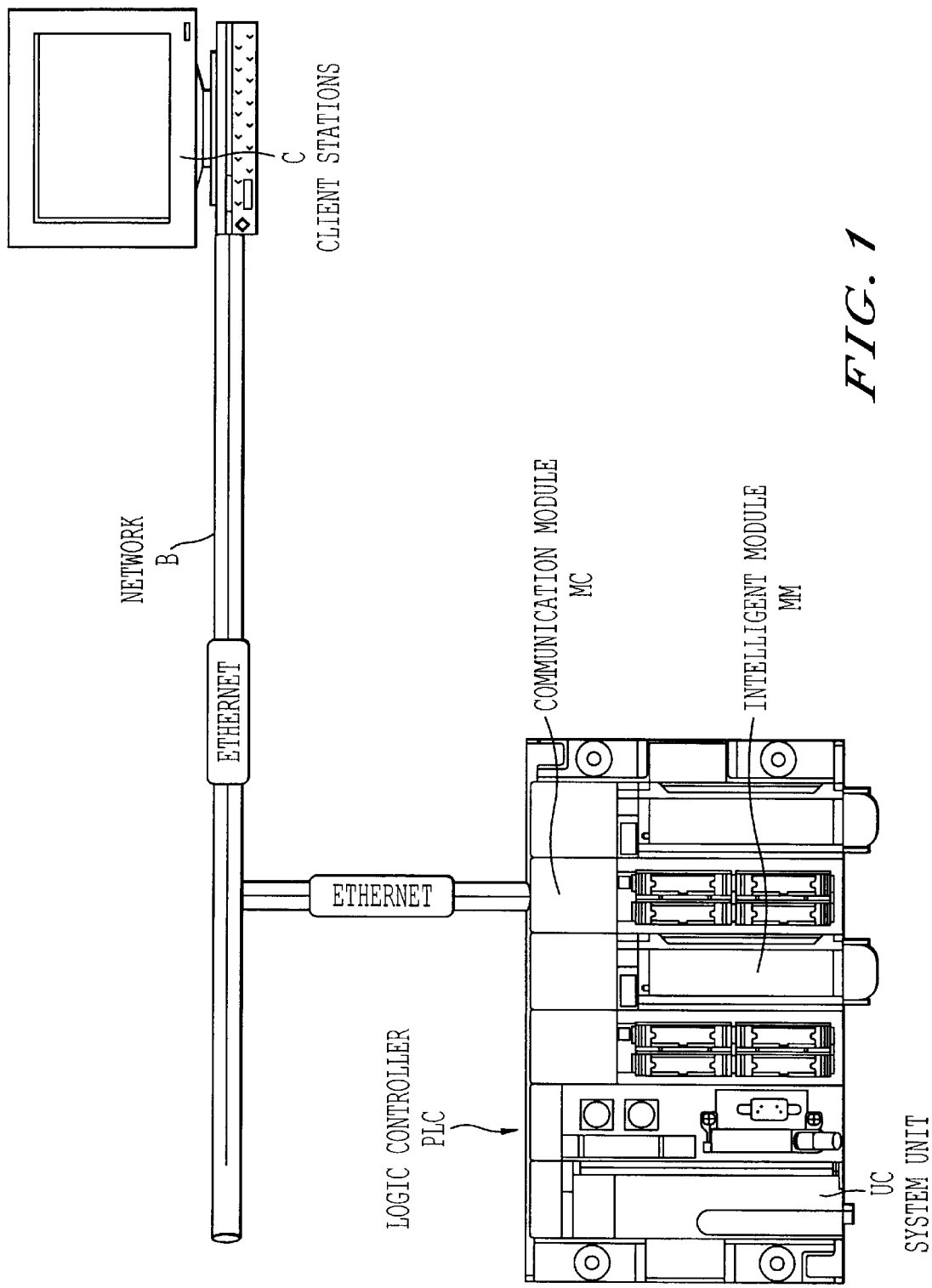
FIG. 1 is a diagram of the hardware architecture of a modular programmable logic controller according to the invention.
Figure 2:
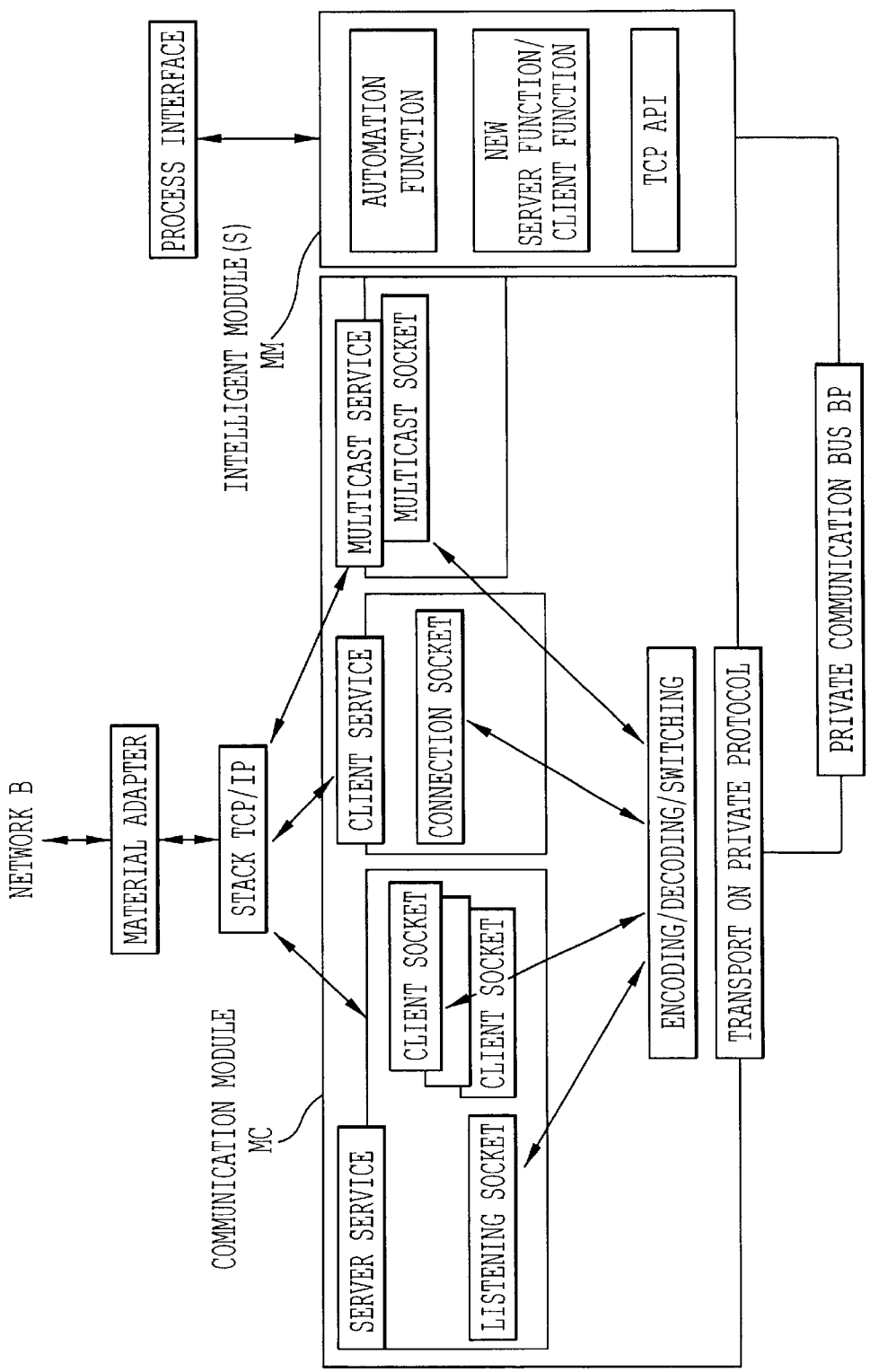
FIG. 2 is a functional diagram illustrating communication functions of a communication module and an intelligent module.

The architecture shown in FIG. 1 comprises a logic controller PLC equipped with a system unit UC, intelligent modules MM with an automation function (weighing, axis control, etc.) and a communication module MC acting as a server. These modules and the system unit communicate through a private communication bus BP that may for example be a back panel bus. This server logic controller PLC may be connected to other programmable logic controllers.

The system unit UC of the programmable logic controller contains an application program written in a normal automation language ("contacts language", etc.). It manages inputs-outputs by using logic controller variables.

The communication module MC is provided with a central memory and a microprocessor and a real time kernel extended by a TCP/IP network layer ("TCP/IP stack") controlling a hardware adapter that it uses to communicate through a network B using the TCP/IP protocol, with one or more client stations C (computers).

The hardware architecture of the communication module MC comprises:

a Server delegation service enabling an automation function of an intelligent module MM to delegate opening and management of a server connection on the TCP/IP type network B, to the module MC, a client delegation service enabling an automation function of an intelligent module MM to delegate opening and management of a client connection on the TCP/IP type network B, to the module MC, a Multicast delegation service enabling an automation function of an intelligent module MM to delegate opening and management of a Multicast connection on the TCP/IP type network B, to the module MC, an encoding/decoding and switching service that firstly encodes queries originating from the previous services using one of the protocols supported by the private communication bus (BP) and switch them to be routed to the intelligent modules, and secondly decoding queries from intelligent modules (MM) and switching them to one of the delegation services defined above.

The software architecture of the intelligent module MM comprises an application programming interface (API), TCP API, that enables remote use of the services delegated from the communication module MC. Therefore, the programmer developing (or extending) the automation function of the intelligent module MM can use the TCP API interface in three different ways to create:

a server function: using the "server TCP API" interface a client function: using the "client TCP API" interface a function to participate in a Multicast group: "Multicast TCP API".

Figure 3:
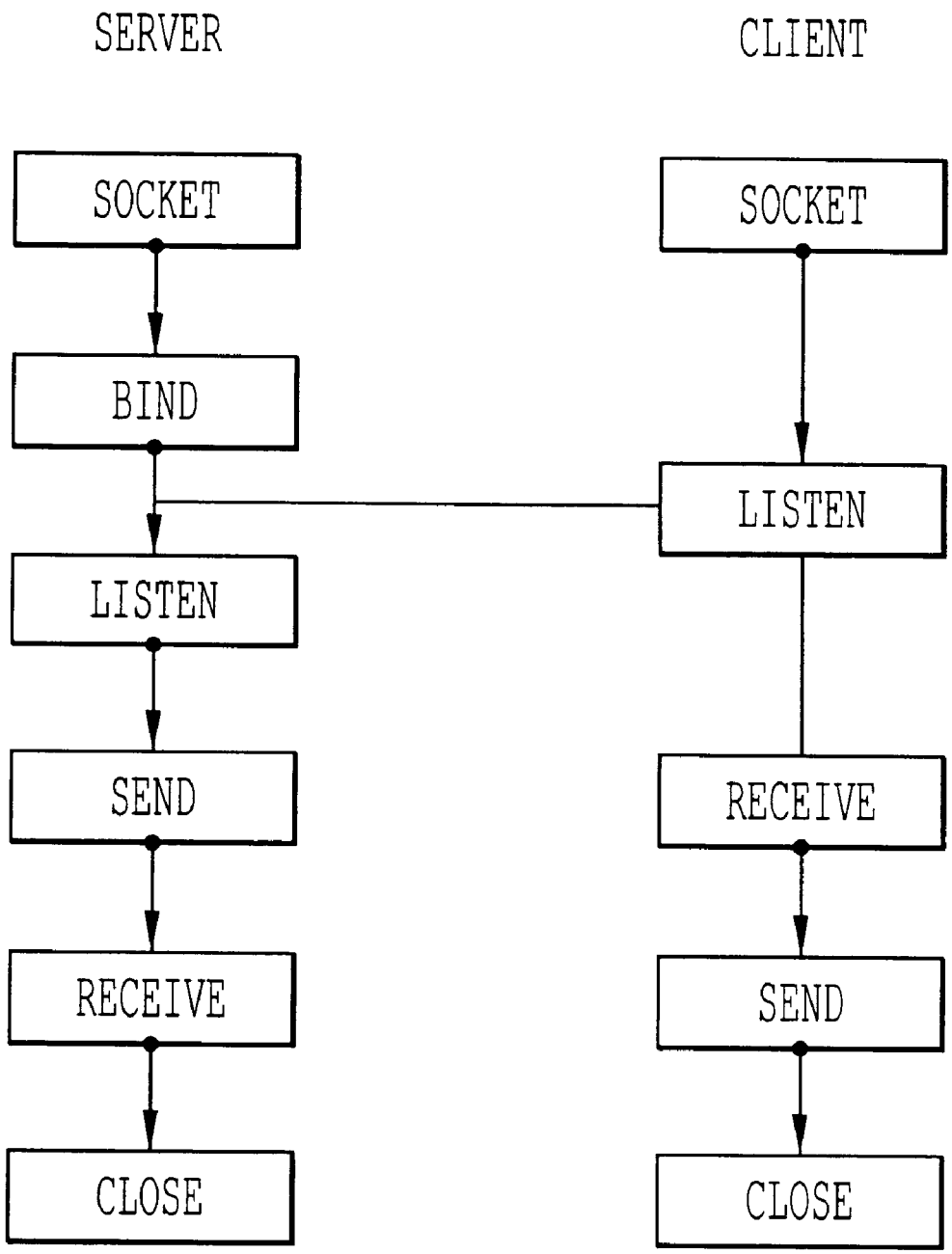
FIG. 3 illustrates the different connection and communication functions between a client and a server.

The "server TCP API" interface comprises functions that the server application of the intelligent module MM of the PLC logic controller uses to communicate with the remote client station C (see FIG. 3), namely:

"Socket", that creates a listening socket in order to prepare a connection. A socket is a data structure materializing information that the automation function program uses to access network layers.

"Bind" that attaches a port number to a socket.

"Listen" that puts a server type socket into listening to client connections.

"Accept" that creates a client socket when a client makes a remote connection.

"Shutdown", "Close" that close the connection and return the resources used.

Two data streams (characters) are set up between the client and the server after the connection, by the following functions:

"Recv" that receives characters from the client TCP/IP data stream

"Send" that sends characters to the client TCP/IP data stream.

The "client TCP API" interface consists of functions that enable the client automation function of the intelligent module MM of the logic controller PLC to communicate with the remote server station C (see FIG. 3) namely:

"Socket" that creates a socket. A socket is a data structure materializing information that the automation function program uses to access network layers.

"Connect" that connects the socket to a remote server.

"Shutdown", "Close" that close the connection and return the resources used.

Two data streams (characters) are set up between the client and the server after the connection, by the following functions:

"Recv" that receives characters from the server TCP/IP data stream

"Send" that sends characters to the server TCP/IP data stream.

The automation function performed by the intelligent module MM to participate in a Multicast communication group uses an application programming interface (Multicast TCP API) that encodes/decodes the following functions in the form of requests:

Socket create a socket for preparation of a connection

Join join the socket to a Multicast group

Recv receive characters from the Multicast group data stream

Send send characters to the Multicast group data stream

Leave disconnect the socket from the Multicast group

Close service functions to return resources used.

The "TCP API" interface functions (server, client, multicast) described above behave in a similar manner to functions with the same names in the libc library provided with the gnu c compiler. However, "TCP API" functions have additional parameters (arguments) that are not in libc. These arguments are used to encode information to transport it on the communication bus and interpret it with delegated services of the module MC and to switch requests output from the TCP API interface onto the private communication bus BP (addressing of modules on private communication bus, etc.).

These arguments also include a "status block" that enables asynchronism between the automation function of the intelligent module MM and the delegated services of the module MC. This is why the first call to a function sends a request to the delegated service of the communication module MC and initializes the status block. Subsequent calls with the same status block retrieve function return parameters; when the function is terminated in module MC, it sends a message to module MM. The automation function of the intelligent module MM can thus carry out actions, for example using interfaces connecting the module to the process that it controls (process interface) between the successive calls described above; this is asynchronism.

The automation function of the module MM is interfaced with a server, client or "Multicast group" function by adopting conventions to be defined by the system analysis for operating modes (sequence of operations to be performed to provide relevant information for controlled processes or to act on these processes) and assignment of port numbers (for a server) or remote addresses for client functions with the logic controller application program.

The TCP API interface can be implemented in the system unit UC of the programmable logic controller that is a particular intelligent module, the supported automation function being called the logic controller application program.

The programmable logic controller application program also uses a system instruction set in the automation language (known as PL7 for Schneider Automation logic controllers) corresponding to server, client or Multicast services delegated to perform server, client or multicast functions.

With this type of application, the logic controller can be a client or server of any remote server or client application.

For example, an HTTP server implemented in the intelligent module MM can exhibit the configuration of this module through HTML pages generated on line, to a client station equipped with a WEB browser. This intelligent module MM can thus be configured on or off line.

Operation will now be explained for a logic controller with a configuration that comprises a communication module MC supporting TCP/IP.

When the logic controller starts, the intelligent module MM starts its HTTP server. For example, the assignment of ports for each server includes the geographic number of the intelligent module MM to enable unique and easy identification for the person doing the programming or maintenance of the programmable logic controller application, or the person using it.

Java applets could also perform dynamic refreshment functions.

In addition to "on-line" mode, a virtual module may be installed when configuring the logic controller that starts a simulation server on the programming station performing functions similar to the onboard server in the module.

Obviously, it will be possible to imagine variants and improvements to detail and even to envisage the use of equivalent means, without going outside the framework of the invention.

What is claimed is:

1. A programmable logic controller system, comprising:
a private operating system that does not support a TCP/IP protocol;
a communication module connected to a private communication bus including a plurality of supported protocols, and a TCP/IP network, said communication module including:
TCP/IP connection and communication functions,
a plurality of delegation services, and
a transcoding and routing service configured to encode, decode, and route a request; and
at least one intelligent module comprising an HTTP server and at least one application having an application programming interface configured to use the TCP/IP connection and communication functions from a remote location,
wherein the plurality of delegation services are configured to enable the at least one application to delegate services to the communication module on the TCP/IP network.

2. The programmable logic controller system according to claim 1, wherein the plurality of delegation services comprise:
a server delegation service configured to enable the at least one application to delegate to the communication module opening and management of a server connection on the TCP/IP network;
a client delegation service configured to enable the at least one application to delegate to the communication module opening and management of a client connection on the TCP/IP network; and
a multicast delegation service configured to enable the at least one application to delegate the communication module opening and management of a multicast connection on the TCP/IP network.

3. The programmable logic controller system according to claim 2, wherein the transcoding and routing service encodes the request originating from one of the plurality of delegation services using one or more of the plurality of supported protocols, routes the request to the at least one intelligent module, decodes the request from the at least one intelligent module, and routes the request to one of the plurality of delegation services.

4. The programmable logic controller system according to claim 3, wherein the communication module is connected to remote equipment through the private communication bus.

5. The programmable logic controller system according to claim 3, wherein the application programming interface comprises:
a plurality of functions configured to approximate GNU C compiler libc library functionality with additional encoding arguments to facilitate transport on the private communication bus and to be interpreted by the plurality of delegation services, and to route messages from the application programming interface on the private communication bus.

6. The programmable logic controller system according to claim 5, wherein a first call to one of the plurality of functions sends the request to one of the plurality of delegation services and initializes a status block transferred as a parameter to guarantee asynchronism between the at least one application and one of the plurality of delegation services, subsequent calls with the same status block are used to retrieve function return parameters, and wherein a message is sent to the at least one intelligent module when a function is terminated in the communication module.

7. A programmable logic controller system, comprising:
a private operating system that does not support a TCP/IP protocol;
at least one intelligent module including an HTTP server and at least one application having an application programming interface; and
a communication module connected to a TCP/IP network and a private communication bus supporting a plurality of supported protocols, wherein the communication module comprises:
TCP/IP connection and communication functions, said application programming interface of the at least one intelligent module being configured to use the TCP/IP connection and communication functions from a remote location,
a plurality of delegation services including a server delegation service configured to enable the at least one application to delegate to the communication module opening and management of a server connection on the TCP/IP network, a client delegation service configured to enable the at least one application to delegate to the communication module opening and management of a client connection on the TCP/IP network, and a multicast delegation service configured to enable the at least one application to delegate to the communication module opening and management of a multicast connection on the TCP/IP network, and
a transcoding and routing service configured to encode a request originating from one of the plurality of delegation services using one or more of the plurality of supported protocols, route the request to the at least one intelligent module, decode the request from the at least one intelligent module, and route the request to one of the plurality of delegation services.

8. The programmable logic controller system according to claim 7, wherein the application programming interface comprises:
a plurality of functions configured to approximate GNU C compiler libc library functionality with additional encoding arguments to facilitate transport on the private communication bus and to be interpreted by the plurality of delegation services, and to route messages from the application programming interface on the private communication bus.

9. The programmable logic controller system according to claim 8, wherein a first call to one of the plurality of functions sends the request to one of the plurality of delegation services and initializes a status block transferred as a parameter to guarantee asynchronism between the at least one application and one of the plurality of delegation services, subsequent calls with the same status block are used to retrieve function return parameters, and wherein a message is sent to the at least one intelligent module when a function is terminated in the communication module.

* * * * *